Jan. 6, 1942. V. F. CAHOY 2,269,051
SOIL AND MOISTURE CONSERVING DISK OR BLADE
Filed Oct. 23, 1939
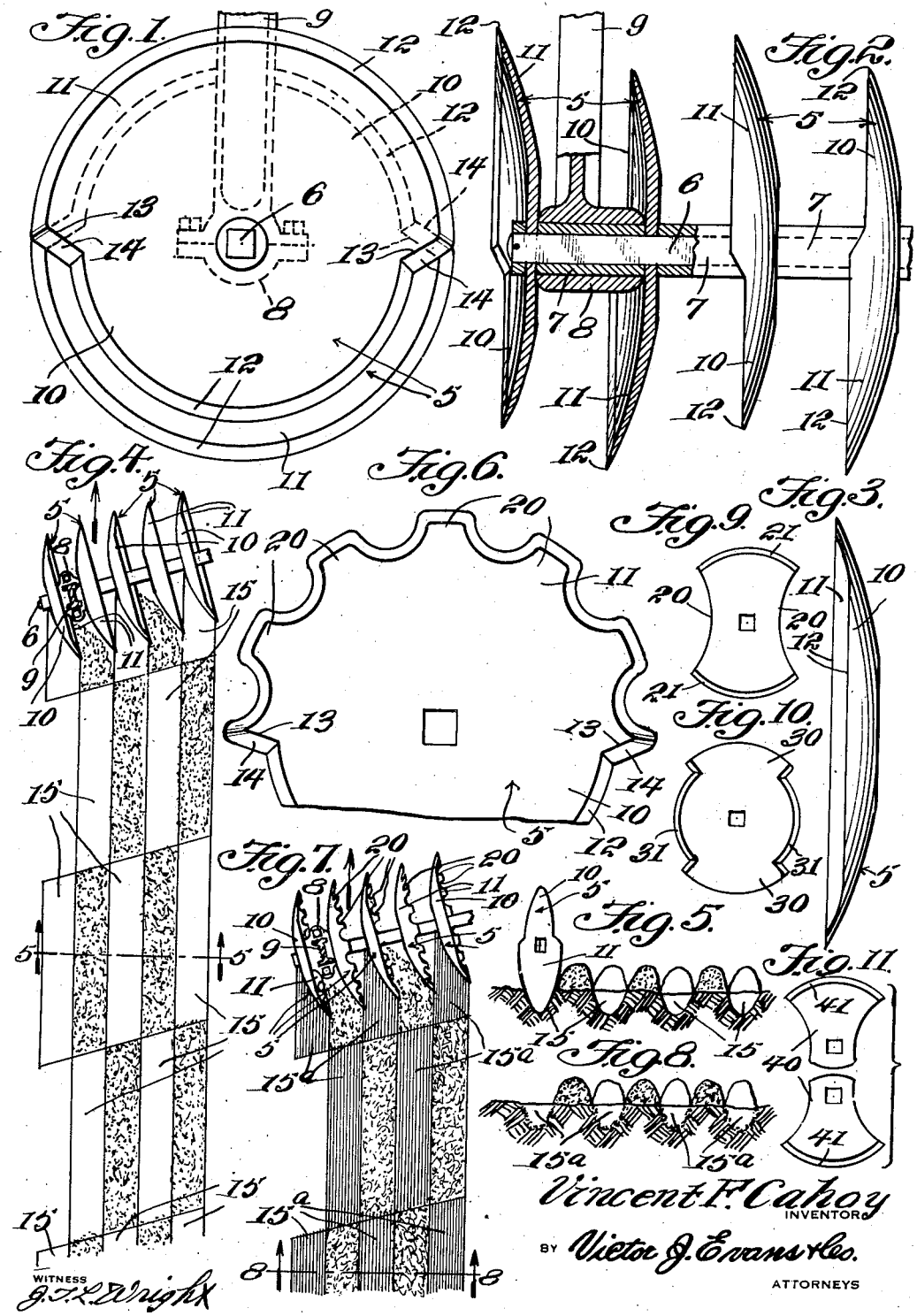

Patented Jan. 6, 1942

2,269,051

UNITED STATES PATENT OFFICE 2,269,051

SOIL AND MOISTURE CONSERVING DISK OR BLADE

Vincent F. Cahoy, Colome, S. Dak.

Application October 23, 1939, Serial No. 300,856

1 Claim. (Cl. 97—217)

My invention relates to disks or blades and more particualrly to a disk or blade for conserving soil and moisture.

One of the principal objects of my invention is to provide a disk so constructed and arranged for cultivating the soil in a manner to form furrows with spaced interruptions or dams resulting in a series of pockets or traps to preclude erosion of the soil by wind or water, it being understood that in the case of a heavy rainfall the pockets will hold water until such time as the same is absorbed by the soil and that in the case of a heavy dry wind the pockets provide a place for the loose soil to lodge, thereby cohibiting soil blowing.

Another object of my invention is to provide a disk of the above described character formed with cutting edges for penetrating below the usual depth of cultivation and operating to raise relatively hard, cloggy soil to the top thereby improving the texture of the cultivated soil.

A further object of my invention is to provide a plurality of disks of the character described capable of being substituted for the ordinary type of disks usually employed in agricultural implements for tilling the soil and without modifying the implement to which the disks are attached.

An important object of my invention is to provide a disk of the above described character which is simple in construction, durable in use, efficient in operation and economical in manufacture.

Other objects and advantages will be apparent from the following description, appended claim and annexed drawing.

Referring to the drawings wherein like reference characters designate like parts throughout the several views:

Figure 1 is a side elevation of my novel form of disks illustrating the same assembled on an axle.

Figure 2 is an end elevation thereof, some of the disks and parts being illustrated in section.

Figure 3 is a top plan view of one of the disks.

Figure 4 is a top plan view of a plurality of the disks in assembled relation and illustrating a postjacent area of soil over which said disks have been operated.

Figure 5 is a sectional view taken on the line 5—5 of Figure 4.

Figure 6 is a side elevation of a modified form of disk.

Figure 7 is a top plan view of a plurality of the disks depicted in Figure 6 and illustrating a postjacent area of soil over which said disks have been operated.

Figure 8 is a sectional view taken on the line 8—8 of Figure 7.

Figure 9 is a side elevation of another modification.

Figure 10 is a side elevation of a still further modified form of disk.

Figure 11 is a disassembled side elevation illustrating a disk made up of a pair of sections having cutting edges oppositely disposed with respect to each other.

In practicing my invention, as illustrated in Figures 1 to 5 inclusive of the drawing, I provide a plurality of disks 5 fixed to a shaft or axle 6 for rotation therewith. The shaft is provided with sleeves 7 maintaining the disks in spaced relation with respect to each other. Each end of the shaft is mounted for rotation within a bearing 8 provided on the lower end of a standard 9, the upper end of the latter being attached to a cultivating implement (not shown). Inasmuch as each of the disks 5 are of a like construction, a detailed description of one will suffice, it being understood that the reference characters indicative of parts of one disk are likewise indicative of the same parts of the other disks.

The disk 5 is of a concavo-convex configuration and formed with a pair of semi-circular edge portions 10 and 11, the latter being of a greater circumference than the former. Each of the edge portions are provided with a cutting edge 12 for effectively penetrating the soil. The terminii of one edge portion effects jointure with the terminii of the other edge portion and defines angular related sections 13 having cutting edges 14 effecting jointure with the respective cutting edges 12.

The disks 5 are arranged on the shaft 6 in a manner to dispose the sections 10 and 11 in transverse alignment with the sections 11 and 10 respectively of the adjacent disks whereby when said disks are operated over the soil they function to form spaced furrows having alternately spaced interruptions defining a series of pockets or traps 15 as clearly illustrated in Figures 4 and 5 of the drawing, it being understood that the shaft 6 is disposed at an angle relative to the line of travel of the disks and forms a furrow adjacent the pocket created by the section 11. From the foregoing it will be apparent that disks constructed in accordance with my invention will form a series of pockets for retaining therein precipitation and rain water and also effect accumulation of soil discharged therein by relatively high and dry winds, thereby precluding blowing of the soil over relatively large areas.

In the modification illustrated in Figure 6 the periphery of the section 11 is formed with a plurality of spaced teeth 20 which function to finely pulverize the soil about the walls of the pockets 15a as illustrated in Figures 7 and 8.

In the modification illustrated in Figure 9, the disk is formed with oppositely disposed concaved end walls 20 defining concentrically arranged cutting edges 21 whereby each revolution of the disk forms a pair of spaced pockets.

In the modification illustrated in Figure 10, the disk is formed with a pair of oppositely disposed concentric cutting edges 30 having disposed therebetween convexed side walls 31 whereby each rotation of the disk forms a pair of spaced pockets in the soil.

In a modified form illustrated in Figure 11, the disk is made up of a pair of sections 40 and oppositely disposed cutting edges 41 for engagement with the soil for forming a pair of spaced pockets therein upon each rotation of the disk thereover. Obviously, one of the sections 40 may be replaced with a similar section when the first-mentioned section becomes damaged or to effect the sharpening of the cutting edge.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in advance forms, and that the invention comprehends all construction within the scope of the appended claim.

What I claim is:

In a soil tilling device, an essentially disk-shaped body formed with a pair of diametrically opposed protruding edge portions and a pair of diametrically opposed recessed edge portions, the said edge portions being of arcuate configuration and concentric with the body and the protruding edge portions being of equal radius from the center of the body, whereby rotary operation of the body will form a pair of alternate shoulders and pockets in the soil for each revolution thereof.

VINCENT F. CAHOY.